(No Model.)
J. S. BEESLEY.
LINE AND TRACE CARRIER.
No. 353,618. Patented Nov. 30, 1886.
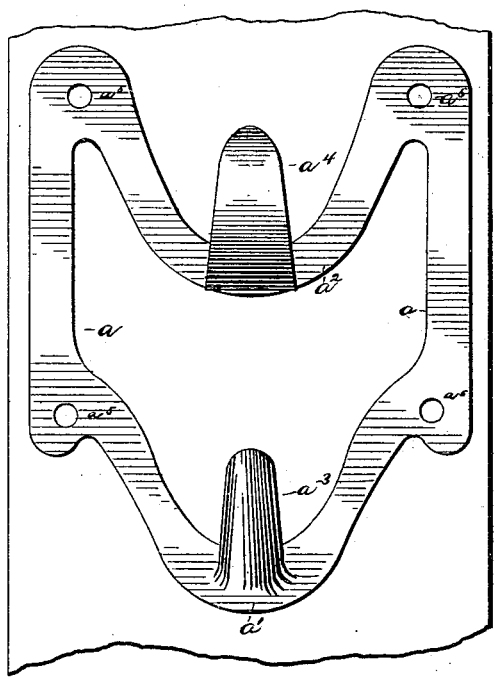
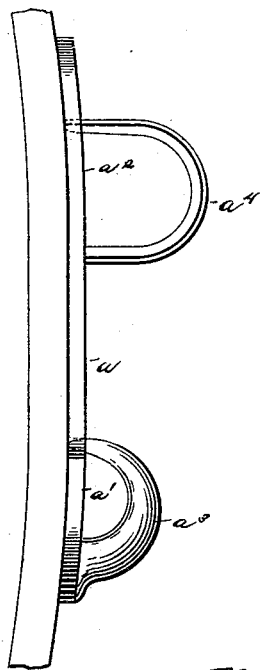
Witnesses
Geo. Thorpe
Wm. N. Moore
Inventor
John S. Beesley
By his Attorneys
C. A. Snow & Co.

UNITED STATES PATENT OFFICE.

JOHN S. BEESLEY, OF BROOKHAVEN, MISSISSIPPI.

LINE AND TRACE CARRIER.

SPECIFICATION forming part of Letters Patent No. 353,618, dated November 30, 1886.

Application filed July 14, 1886. Serial No. 208,027. (No model.)

*To all whom it may concern:*

Be it known that I, JOHN S. BEESLEY, a citizen of the United States, residing at Brookhaven, in the county of Lincoln and State of Mississippi, have invented new and useful Improvements in Attachments for Back-Bands of Harness, of which the following is a specification.

The object of my invention is to provide an attachment for the back-bands of harness, by means of which the traces or tugs may be readily connected to the back-band, and which will also serve to hold the reins and prevent them from dropping upon the ground or becoming entangled with the traces, my invention being especially designed for application to plow-harness.

To the above purposes my invention consists in the peculiar and novel features of construction and arrangement, as hereinafter described and claimed.

In order that my invention may be fully understood, I will proceed to describe it with reference to the accompanying drawings, in which—

Figure 1 is a side view of my improved attachment applied to the back-band of a harness. Fig. 2 is an edge view of the same.

The body or frame of my improved attachment consists of two parallel arms, $a$ $a$, connected at their lower ends by a U-shaped bar, $a'$, and at their upper ends by a similar U-shaped bar, $a^2$. At the middle of the bar $a'$ is formed an upturned hook, $a^3$, and at the middle of the bar $a^2$ is formed an upturned hook, $a^4$. The points of these hooks extend inward to such an extent that when the body or frame is attached to the back-band said hooks become practically closed loops, as shown in Fig. 2. At the ends of bars $a$ are formed holes or eyes $a^5$, to receive screws or rivets for attaching the device to the back-band.

The trace or tug is placed within or upon the lower hook, $a^3$, while the rein is placed in the upper hook, $a^4$, and, owing to the near approach of the ends of said hooks to the back-band, said rein and trace or tug cannot accidentally work off from said hooks. The upper hook is preferably broader and longer than the lower hook, as shown.

Having thus described my invention, what I claim as new, and desire to secure by Letters Patent, is—

As an improved article of manufacture, the herein-described plate to be secured over the back-bands of harness, and made of a skeletonized frame comprising the side bars, $a$, the transverse bars $a^2$ $a'$, connecting the side bars at their extremities, and the hooks $a^3$ $a^4$ on the transverse bars arranged one beneath the other, the hook $a^3$ receiving the trace, while the hook $a^4$ supports the rein, as set forth.

In testimony that I claim the foregoing as my own I have hereto affixed my signature in presence of two witnesses.

JOHN S. BEESLEY.

Witnesses:
I. WARREN,
C. F. MARSHALL.